US008958630B1

(12) United States Patent
Gallup et al.

(10) Patent No.: US 8,958,630 B1
(45) Date of Patent: Feb. 17, 2015

(54) SYSTEM AND METHOD FOR GENERATING A CLASSIFIER FOR SEMANTICALLY SEGMENTING AN IMAGE

(75) Inventors: David Gallup, Lynnwood, WA (US); Rahul Raguram, Chapel Hill, NC (US)

(73) Assignee: Google Inc., Mountain View, CA (US)

( * ) Notice: Subject to any disclaimer, the term of this patent is extended or adjusted under 35 U.S.C. 154(b) by 570 days.

(21) Appl. No.: 13/287,890

(22) Filed: Nov. 2, 2011

Related U.S. Application Data

(60) Provisional application No. 61/550,888, filed on Oct. 24, 2011.

(51) Int. Cl.
*G06K 9/62* (2006.01)
(52) U.S. Cl.
USPC .......................................................... 382/159
(58) Field of Classification Search
None
See application file for complete search history.

(56) References Cited

U.S. PATENT DOCUMENTS

| | | | | |
|---|---|---|---|---|
| 5,689,620 | A * | 11/1997 | Kopec et al. | 706/12 |
| 6,816,628 | B1 * | 11/2004 | Sarachik et al. | 382/285 |
| 7,403,648 | B2 * | 7/2008 | Nakamura | 382/141 |
| 7,742,623 | B1 * | 6/2010 | Moon et al. | 382/103 |
| 7,957,583 | B2 * | 6/2011 | Boca et al. | 382/154 |
| 8,200,028 | B2 * | 6/2012 | Gabso et al. | 382/232 |
| 8,582,871 | B2 * | 11/2013 | Skipper et al. | 382/159 |
| 2002/0028021 | A1 * | 3/2002 | Foote et al. | 382/224 |
| 2005/0163375 | A1 * | 7/2005 | Grady | 382/180 |
| 2008/0089591 | A1 * | 4/2008 | Zhou et al. | 382/224 |
| 2009/0083010 | A1 * | 3/2009 | Qi et al. | 703/2 |
| 2009/0313294 | A1 * | 12/2009 | Mei et al. | 707/103 R |
| 2011/0081073 | A1 * | 4/2011 | Skipper et al. | 382/159 |

OTHER PUBLICATIONS

Brostow et al., "Segmentation and Recognition Using Structure from Motion Point Clouds", ECCV 2008, pp. 44-57, LNCS 5302, Part I, Springer-Verlag Berlin Heidelberg.
Shotton et al., "TextonBoost for Image Understanding: Multi-Class Object Recognition and Segmentation by Jointly Modeling Texture, Layout, and Context", Int J Comput Vis, 2009, pp. 2-23, vol. 81.
Veksler et al., "Superpixels and Supervoxels in an Energy Optimization Framework", ECCV 2010, pp. 211-224, LNCS 6315, Part V, Springer-Verlag Berlin Heidelberg.

(Continued)

*Primary Examiner* — Thomas Conway
(74) *Attorney, Agent, or Firm* — Lerner, David, Littenberg, Krumholz & Mentlik, LLP

(57) ABSTRACT

Systems, methods, and machine-readable media for generating a classifier configured to label segments of an image, are discussed. According to one aspect, the system may include a training module, a labeling module, and an update module. The training module may be configured to train a first sub-classifier based on photographic data for a set of pre-labeled image segments and a second sub-classifier based on 3-dimensional point data for the set of pre-labeled image segments. The labeling module may be configured to generate a labeling solution comprising a plurality of associations between an image segment from the set of unlabeled image segments and a label. The update module may be configured to update the set of pre-labeled image segments based on the labeling solution. The training module may also be configured to train the first sub-classifier and the second sub-classifier based on the updated set of pre-labeled image segments.

17 Claims, 7 Drawing Sheets

(56) References Cited

OTHER PUBLICATIONS

Blum et al., "Combining Labeled and Unlabeled Data with Co-Training", COLT: Proceedings of the Workshop on Computational Learning Theory, 1998, pp. 92-100 Morgan Kaufmann.

Hoiem et al., "Recovering Surface Layout from an Image", International Journal of Computer Vision, Oct. 2007, pp. 151-172, vol. 75, No. 1.

Xiao et al., "Multiple View Semantic Segmentation for Street View Images", Proceedings of 12th IEEE, 2009, International Conference on Computer Vision (ICCV), pp. 686-693.

Zhang et al, "Semantic Segmentation of Urban Scenes Using Dense Depth Maps", European Conference on Computer Vision (ECCV), 2010, pp. 708-721, LNCS 6314, Part IV, Springer-Verlag Berlin Heidelberg.

* cited by examiner

Image for a Scene

3D Point Data for the Scene

SYSTEM AND METHOD FOR GENERATING A CLASSIFIER FOR SEMANTICALLY SEGMENTING AN IMAGE

RELATED APPLICATION

This application claims priority to U.S. Provisional Patent Application No. 61/550,888, filed on Oct. 24, 2011, entitled "SYSTEM AND METHOD FOR GENERATING A CLASSIFIER FOR SEMANTICALLY SEGMENTING AN IMAGE," the entire contents of which are herein incorporated by reference in its entirety.

BACKGROUND

The present disclosure generally relates to image processing and, in particular, to semantically segmenting an image.

Semantically segmenting (e.g., labeling) an image is useful in many image processing applications. For example, after portions of an image are labeled, the labeled portions of the image may be quickly identified and/or processed in different ways depending on the label. Certain types of image processing may remove image elements with a particular label in order to simplify the image. Facial recognition applications may focus specific facial recognition techniques on image elements with certain labels (e.g., a "face" label or a "person" label) in order to increase performance and accuracy of the facial recognition processes.

Image labeling may also be helpful in certain applications where images taken in the public are published and, in order to protect the privacy of individuals, portions of the image showing a person's face or a motor vehicle's license plate may be blurred before the images are published. For example, a blurring application may conserve computing resources and time as well as increase accuracy by focusing certain blurring processes on portions of an image labeled "car," "license plate," "person," or "face."

Methods for labeling an image typically analyze photographic data (e.g., the color histogram, the texture histogram, etc.) of an image in order to segment the image.

SUMMARY

According to one aspect of the subject technology, a system for generating a classifier configured to label segments of an image, wherein the classifier comprises a first sub-classifier and a second sub-classifier is provided. The system may include a training module, a labeling module, and an update module. The training module may be configured to train a first sub-classifier based on photographic data for a set of pre-labeled image segments and a second sub-classifier based on 3-dimensional (3D) point data for the set of pre-labeled image segments. The labeling module may be configured to generate a labeling solution comprising a plurality of associations between an image segment from the set of unlabeled image segments and a label, wherein the labeling solution is generated by running the first sub-classifier on a set of unlabeled image segments and running the second sub-classifier on the set of unlabeled image segments. The update module may be configured to update the set of pre-labeled image segments based on the labeling solution generated by the first sub-classifier and the second sub-classifier. The training module may also be configured to train the first sub-classifier and the second sub-classifier based on the updated set of pre-labeled image segments.

According to another aspect of the subject technology, a method for generating a classifier configured to label segments of an image, wherein the classifier comprises a first sub-classifier and a second sub-classifier is provided. The method may include training a first sub-classifier based on photographic data for a first set image segments and a second sub-classifier based on 3-dimensional (3D) point data for the first set of image segments. The method may also include automatically creating, based on the training, a labeling solution for a second set of image segments by running the first sub-classifier on the second set of image segments and running the second sub-classifier on the second set of image segments. The method may further include updating the first set of image segments based on the labeling solution and retraining the first sub-classifier and the second sub-classifier based on the updated first set of image segments.

According to yet another aspect of the subject technology, a machine-readable medium including instructions stored therein, which when executed by a machine, cause the machine to perform operations for generating a classifier configured to label segments of an image is provided. The operations may include training a first sub-classifier based on photographic data for a set of pre-labeled image segments and a second sub-classifier based on 3-dimensional (3D) point data for the set of pre-labeled image segments. The operations may also include, for at least one iteration, generating a labeling solution by running the first sub-classifier on a set of unlabeled image segments and running the second sub-classifier on the set of unlabeled image segments, updating the set of pre-labeled image segments based on the labeling solution generated by the first sub-classifier and the second sub-classifier, and training the first sub-classifier and the second sub-classifier based on the updated set of pre-labeled image segments.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Figure 1:
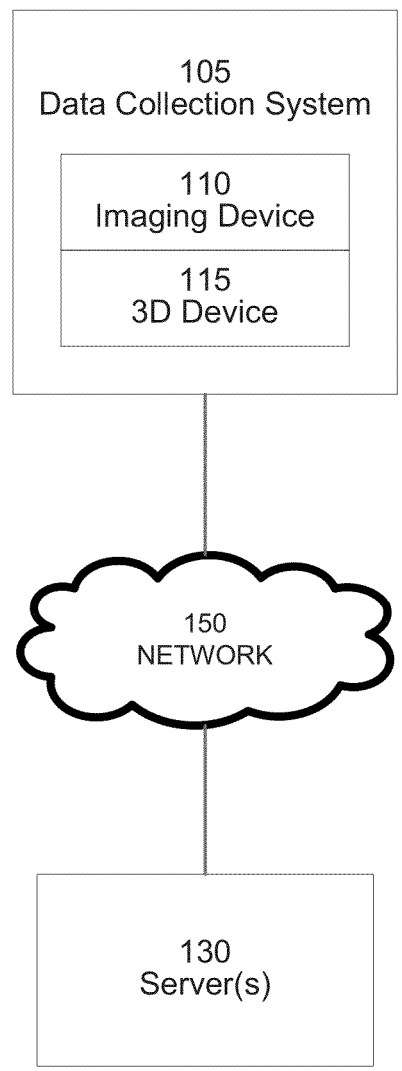
FIG. 1 is a conceptual diagram illustrating a network environment in which aspects of the subject technology may be implemented, in accordance with one aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

According to various aspects of the subject technology, systems and methods for generating a classifier configured to label segments of an image are provided. After the classifier is generated, the classifier may assign different labels (e.g., "architecture," "plant," "ground," "sky," "car," "person," "sidewalk," etc.) to segments of an image of a scene. The image segments (e.g., super pixels) may be portions of a larger image that has been partitioned based on the similarity of pixels within the image segment and the differences with respect to the pixels outside the boundary of the image segment.

A classifier may be generated using a machine learning algorithm (e.g., a co-training algorithm) that iteratively trains two or more sub-classifiers that each focus on a different view (e.g., two or more different, conditionally independent data sets) of the same scene. For example, the different views or data sets used to train the sub-classifiers may be photographic data (e.g., the color histogram, the texture histogram, etc.) and 3-dimensional (3D) point data, as will be described in more detail further below.

According to some aspects, the system may receive a limited number of pre-labeled image segments which may be assumed to be correctly labeled. The pre-labeled image segments may be used by the system to train the sub-classifiers based on different views (e.g., the different views may include photographic data and 3D point data). For example, a first sub-classifier may be trained to label image segments by learning, from the pre-labeled image segments, which photographic data features are associated with a particular label. A second sub-classifier may be trained to label image segments by learning, from the pre-labeled image segments, which 3D point data features are associated with a particular label.

After the sub-classifiers are trained, each sub-classifier may be applied to a set of unlabeled image segments and assign labels to each of the unlabeled image segments. One or more of the labels of assigned to the unlabeled image segments may be selected and accepted as "correct" based on how confidently the image segments were labeled by the sub-classifiers. These "correct" labels may be added to the set of pre-labeled image segments and used to train the sub-classifiers for another iteration.

This process may repeat a number of times until the sub-classifiers are sufficiently trained. By iteratively training two separate sub-classifiers on two different views or data sets (e.g., photographic data and 3D point data) of image segments and using the results of one sub-classifier to train the other sub-classifier, the system is able to generate an accurate classifier that leverages both sets of data based on a much smaller number of manually pre-labeled image segments than would otherwise be needed.

FIG. 1 is a conceptual diagram illustrating a network environment 100 in which aspects of the subject technology may be implemented, in accordance with one aspect of the subject technology. Although FIG. 1 illustrates a client-server network environment 100, other aspects of the subject technology may include other configurations including, for example, peer-to-peer environments or single system environments. The network environment 100 may include at least one data collection system 105 and at least one server 130 connected over a network 150.

The network 150 may include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The data collection system 105 may be any system or device (e.g., a personal computer, a server, a mobile device, a laptop, a tablet computer, etc.) having a processor, a memory, and communications capability for transmitting imaging data, 3D point data, or both to the one or more web servers 130. In some aspects, the data collection system 105 may collect various information about the environment that it is in. For example, the data collection system may be carried by a user or installed on a vehicle and used to collect data on various scenes (e.g., a view of various streets or roadways) in the world.

The data collection system 105 may be configured to obtain an photographic data of a scene, 3D point data of a scene, or both using an imaging device 110 (e.g., a camera) and/or a 3D device 115. The imaging device 110 may be configured to obtain an image of a scene that may be used to generate photographic data for the image.

Figure 2A:
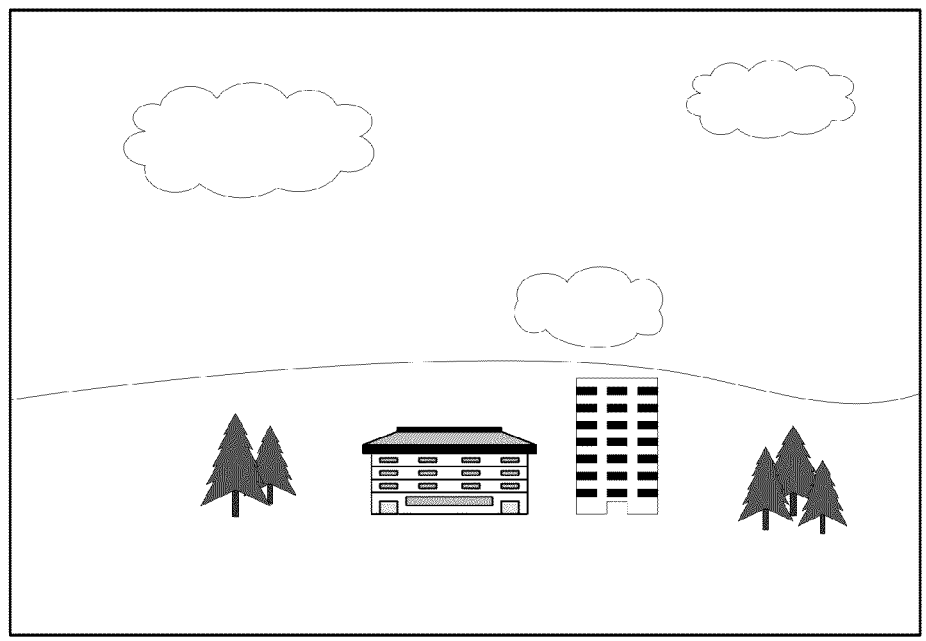
FIG. 2A is a conceptual diagram illustrating an image of a scene obtained by an imaging device, in accordance with one aspect of the subject technology.

For example, FIG. 2A is a conceptual diagram illustrating an image of a scene obtained by an imaging device 110, in accordance with one aspect of the subject technology. The simplified image of FIG. 2A is a visual representation of a scene that includes, among other things, sky, clouds, trees, buildings, etc. Photographic data such as the color histogram for the image, the texture histogram, the gradient histograms, appearance characteristics, or other image features may be generated, based on the image in FIG. 2A, for the entire image or for one or more segments of the image.

The 3D device 115 may be configured to obtain 3D point data corresponding to an image of a scene. In some aspects, the 3D device 115 may be a Light Detection and Ranging (LiDAR) device, a stereo camera, a depth camera, or other 3D point data device. 3D point data may include one or more distance measurements from an object shown in the image to the 3D point data device, a height of an object shown in the image, a surface normal for an object shown in the image, and the planarity of the object shown in the image.

Figure 2B:
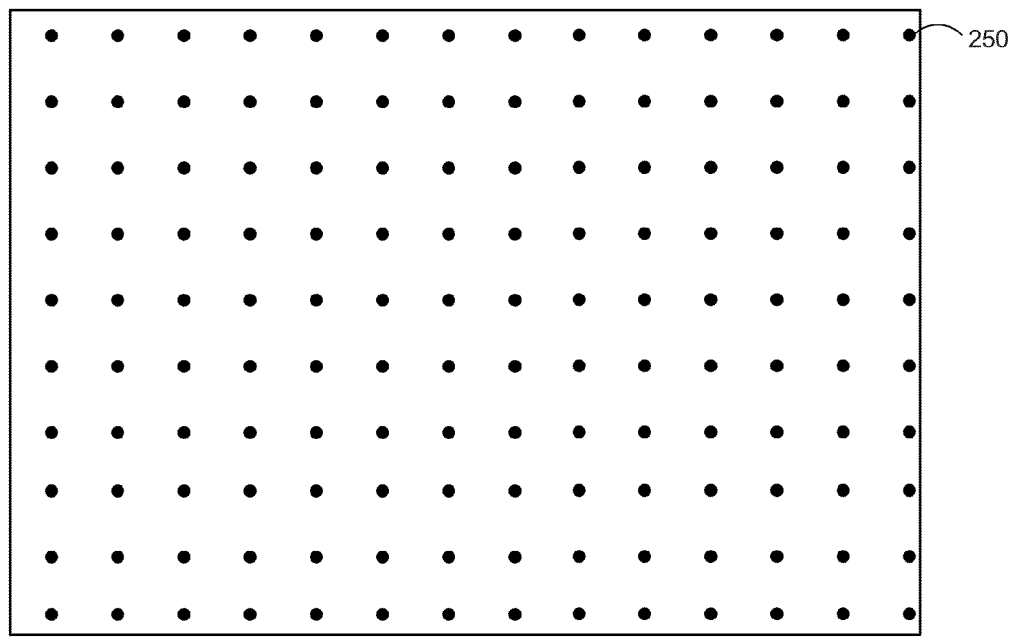
FIG. 2B is a conceptual diagram illustrating 3D point data for a scene obtained by an 3D device, in accordance with one aspect of the subject technology.

For example, FIG. 2B is a conceptual diagram illustrating 3D point data for a scene obtained by an 3D device 115, in accordance with one aspect of the subject technology. The 3D point data in FIG. 2B may be for the same scene as the scene depicted in the image of FIG. 2A. The 3D point data may contain a number of data points 250 that are associated with 3D point data such as the distance from an object located at that data point 250 from the 3D device 115. By finding a correspondence between the 3D point data of FIG. 2B and the image of FIG. 2A, the system may be able to determine, for example, the distance or height of an object (e.g., a tree, a building, a car, a sidewalk, etc.) shown in the image.

The server 130 may receive the photographic data of a scene and 3D point data of the scene from one or more data collection systems 105 and use the data to generate a classifier configured to semantically segment an image (e.g., label portions of the image). Once a classifier is generated, the classifier may be used to label images and provide the labeled images to a user or to other applications.

Figure 3:
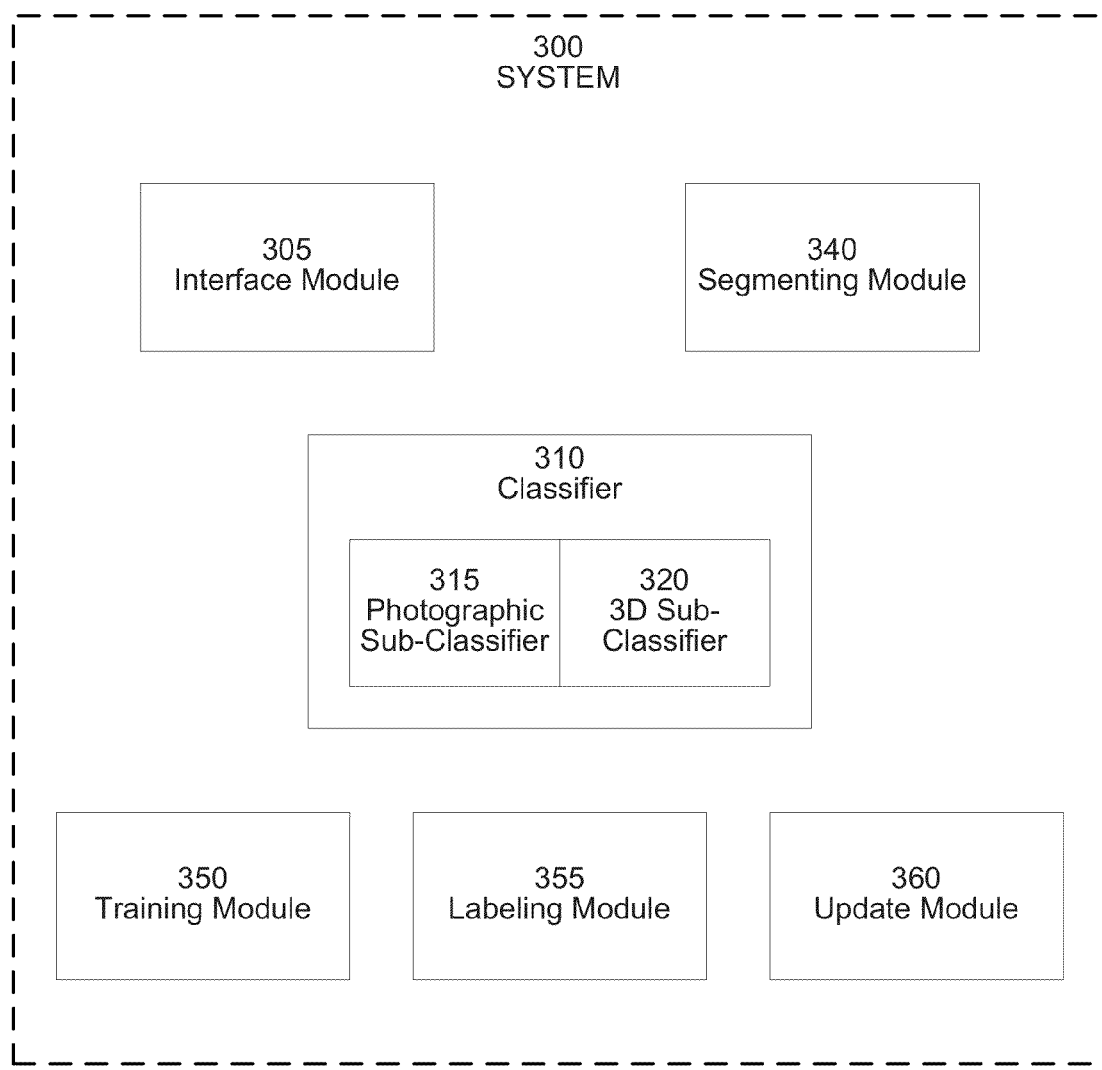
FIG. 3 is a conceptual diagram illustrating a system for generating a classifier configured to label segments of an image, in accordance with one aspect of the subject technology.

FIG. 3 is a conceptual diagram illustrating a system 300 for generating a classifier configured to label segments of an image, in accordance with one aspect of the subject technology. For example, the system 300 may be implemented as a component in the server 130 in the network environment 100 of FIG. 1 and may include an interface module 305, a segmenting module 340, a classifier 310, a training module 350, a labeling module 355, and an update module 360. The modules illustrated in FIG. 3 may include software instructions encoded in a medium and executed by a processor, computer hardware components, or a combination of both. For example, the modules may each include one or more processors or memories that are used to perform the functions described below. According to another aspect, the various systems and modules may share one or more processors or memories.

The interface module 305 may be configured to communicate with one or more systems or servers. For example, the interface module may receive images that are to be labeled by the classifier 310 or transmit labeling solutions for the received images. The interface module 305 may also receive training data that may be used to train the classifier 310. The training data may include for example, a set of pre-labeled image segments and a set of unlabeled image segments.

The segmenting module 340 may be configured to partition an image into a number of image segments. The image segments may be partitioned based on the similarity of pixels within the image segment and the differences with respect to the pixels outside the boundary of the image segment. Any of several partitioning algorithms may be used. The image segments produced by the segmenting module 340 may be used for labeling or for training.

Figure 4:
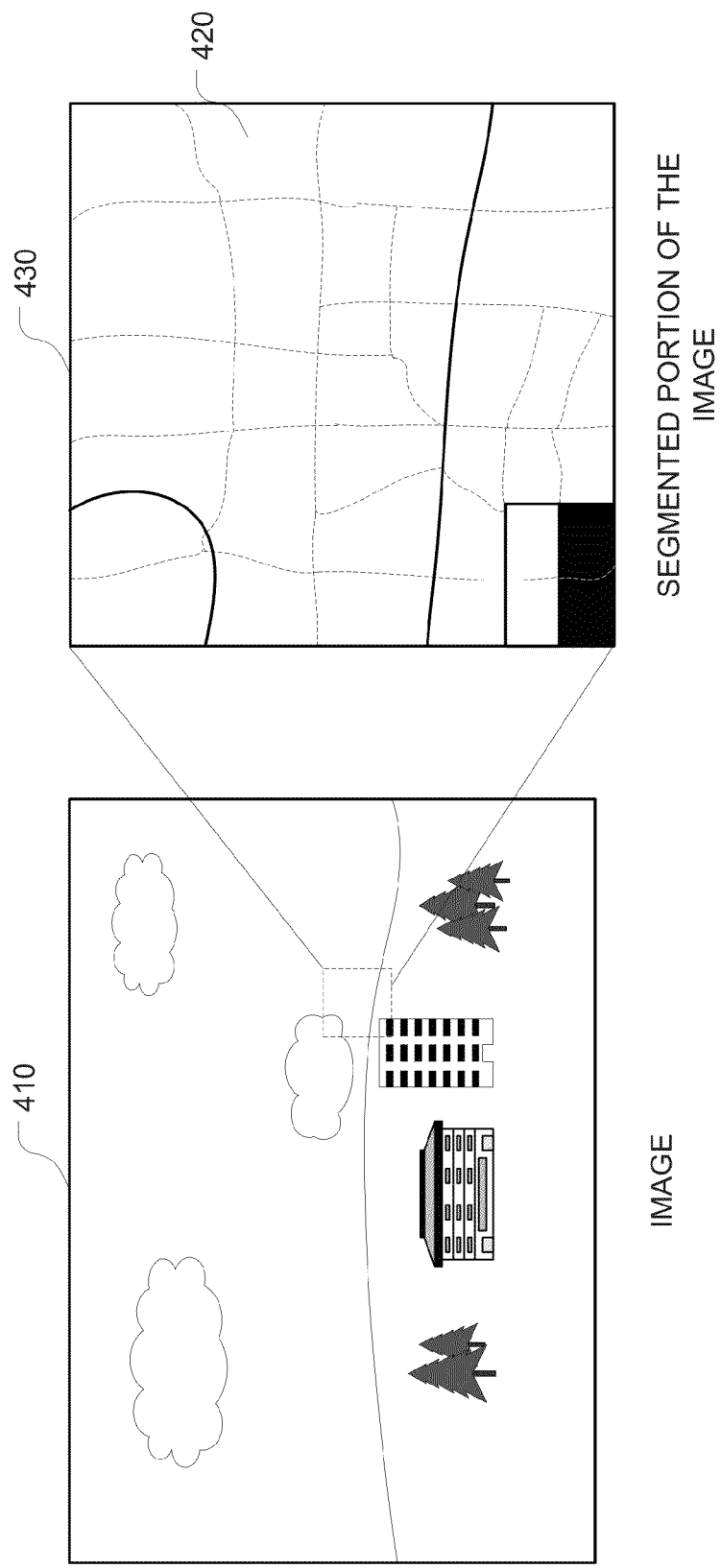
FIG. 4 is a conceptual diagram illustrating segmentation of an image, in accordance with one aspect of the subject technology.

FIG. 4 is a conceptual diagram illustrating segmentation of an image, in accordance with one aspect of the subject technology. For example, image 410 may be an image received from an imaging device 110. The image may be partitioned by the segmenting module 340 into a number of image segments 420, as seen in the zoomed-in portion 430 of FIG. 4. In one aspect, an image may be partitioned into a multitude of super-pixels based on color similarities of the pixels within the super-pixel and differences in color between pixels outside of the super-pixel.

The classifier 310 may be configured to label one or more images based on data associated with the image. In one aspect the classifier 310 may include two or more sub-classifiers that are configured to label images based on separate sets of data.

For example, one sub-classifier (e.g., an photographic sub-classifier 315) may be configured to label images based on photographic data (the appearance) extracted from an image and another sub-classifier (e.g., a 3D sub-classifier 320) may be configured to label images based on 3D point data for the image using. However in order to operate efficiently and accurately, the classifier 310 must first be trained by, for example, the training module 350, the labeling module 355, and the update module 360.

The training module 350 may be configured to train a classifier 310 by training the one or more sub-classifiers (e.g., the photographic sub-classifier 315 and the 3D sub-classifier 320) of the classifier 310 on a set of pre-labeled image segments. These pre-labeled image segments may be labeled by any number of means and are accepted as correctly labeled image segments. For example, the pre-labeled image segments may initially be manually labeled by humans and submitted to the system 300. The set of pre-labeled image segments may also be updated by, for example, the update module 360.

For certain methods of training classifiers, a large number of manually labeled image segments (e.g., labeled image segments from 350 images) may be needed to train the classifier 310. However, having image segments manually labeled may a require substantial amount of time and human effort. According to various aspects of the subject technology, systems and methods for training classifiers may operate on a reduced number of manually labeled image segments (e.g., labeled image segments from 10 images) thereby reducing the amount of manual labor needed to train a classifier accurately.

In accordance with one aspect, the training module 350, the labeling module 355, and the update module 360 may be configured to work in combination to train the classifier 310 using fewer manually pre-labeled image segments by training the classifier 310 through a number of iterations. The training module 350 may be configured to train the photographic sub-classifier 315 using photographic data for the pre-labeled image segments and to train the 3D sub-classifier 320 using 3D point data for the set of pre-labeled image segments.

Once each sub-classifier has been trained using the pre-labeled image segments, the labeling module 355 may be configured to generate a labeling solution for a set of unlabeled image segments by running both the photographic sub-classifier 315 and the 3D sub-classifier 320 on the set of unlabeled image segments. For example, each sub-classifier may be run on the set of unlabeled image segments and label each of the unlabeled image segments. Each of the labelings (e.g., each association between a label and an image segment) in the labeling solution may have a corresponding confidence value that represents how certain the sub-classifier that labeled the image segment is in the labeling.

The update module 360 is configured to select at least one of the labelings of the unlabeled image segments based on the confidence value and add the labelings to the set of pre-labeled image segments. For example, the update module 360 may select a number of the labelings with the highest confidence values or the update module 360 may select all labelings with confidence values that exceed a threshold value. In this way, the system may augment the set of pre-labeled image segments that may be used to train the classifier 310.

Once the update module 360 has updated the set of pre-labeled image segments, another round (e.g., iteration) of training may occur. For example, the training module 350 may train the photographic sub-classifier 315 and the 3D sub-classifier 320 on the updated set of pre-labeled image segments that includes the manually labeled image segments and the image segments added to the pre-labeled set of image elements by the update module 360.

The training of the classifier 310 may repeat for a pre-defined number of iterations (e.g., 3), until the classifier 310 reaches an acceptable level of performance (e.g., a certain percentage of image segments are labeled correctly), or until another condition is met (e.g., a stop condition is detected). Further details of the training methods and systems, according to various aspects of the subject technology are discussed below.

Figure 5:
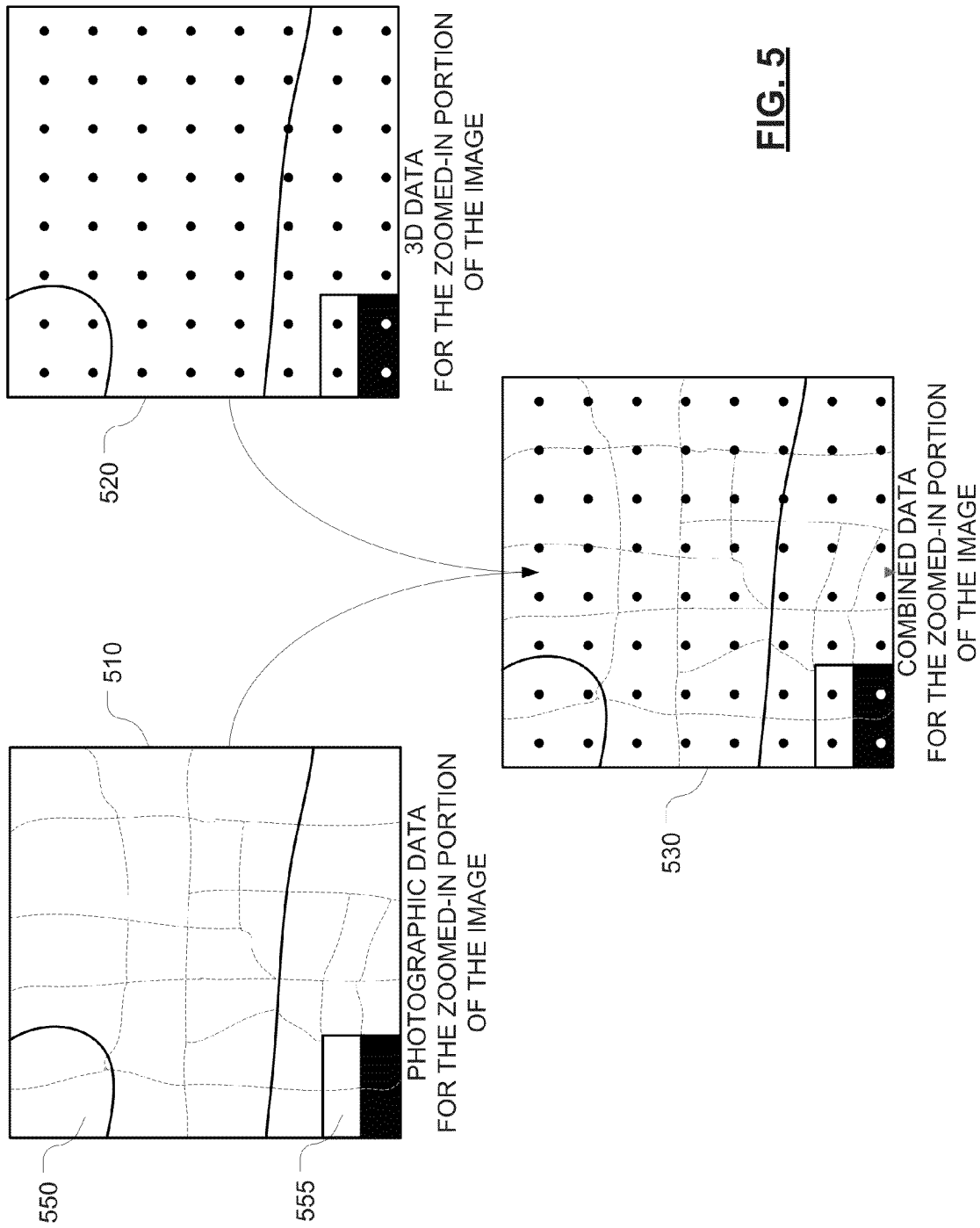
FIG. 5 is a conceptual diagram illustrating the use of photographic data and 3D data to label an image, in accordance with one aspect of the subject technology.

By training two different sub-classifiers on two different sets of data (e.g., 3D point data and photographic data) the system is able to generate a classifier that may leverage both sets of data in determining a labeling solution for an image. FIG. 5 may help to illustrate this.

FIG. 5 is a conceptual diagram illustrating the use of photographic data and 3D data to label an image, in accordance with one aspect of the subject technology. FIG. 5 shows photographic data for image segments of a zoomed-in portion of an image 510 and 3D data for the zoomed-in portion of the image 520. With each sub-classifier analyzing a different set of data, the classifier may be configured to label portions of the image using the combined data for the image (e.g., the combined data for the zoomed-in portion of the image).

For example, an image segment of a white cloud 550 may have similar photographic data to an image segment of a white portion of a building 555. As a result, a classifier using only photographic data (e.g., the color histogram, the texture histogram, the gradient histograms, or other appearance characteristics) may not be able to correctly label both image segments 550 and 555. However, a classifier that also takes into consideration 3D point data such as distance measurements, the height of the object, a surface normal for the object, and the planarity of the object may be able to distinguish between the image segment of the white cloud 550 and the image segment of the white portion of the building 555 and label them accordingly.

Furthermore, by iteratively training the sub-classifiers and updating the set of pre-labeled image segments with the most confidently labeled image segments, the system is able to accurately train the classifier using fewer initially labeled image segments. Further details regarding this and other aspects of the subject technology are discussed with respect to FIG. 6.

Figure 6:
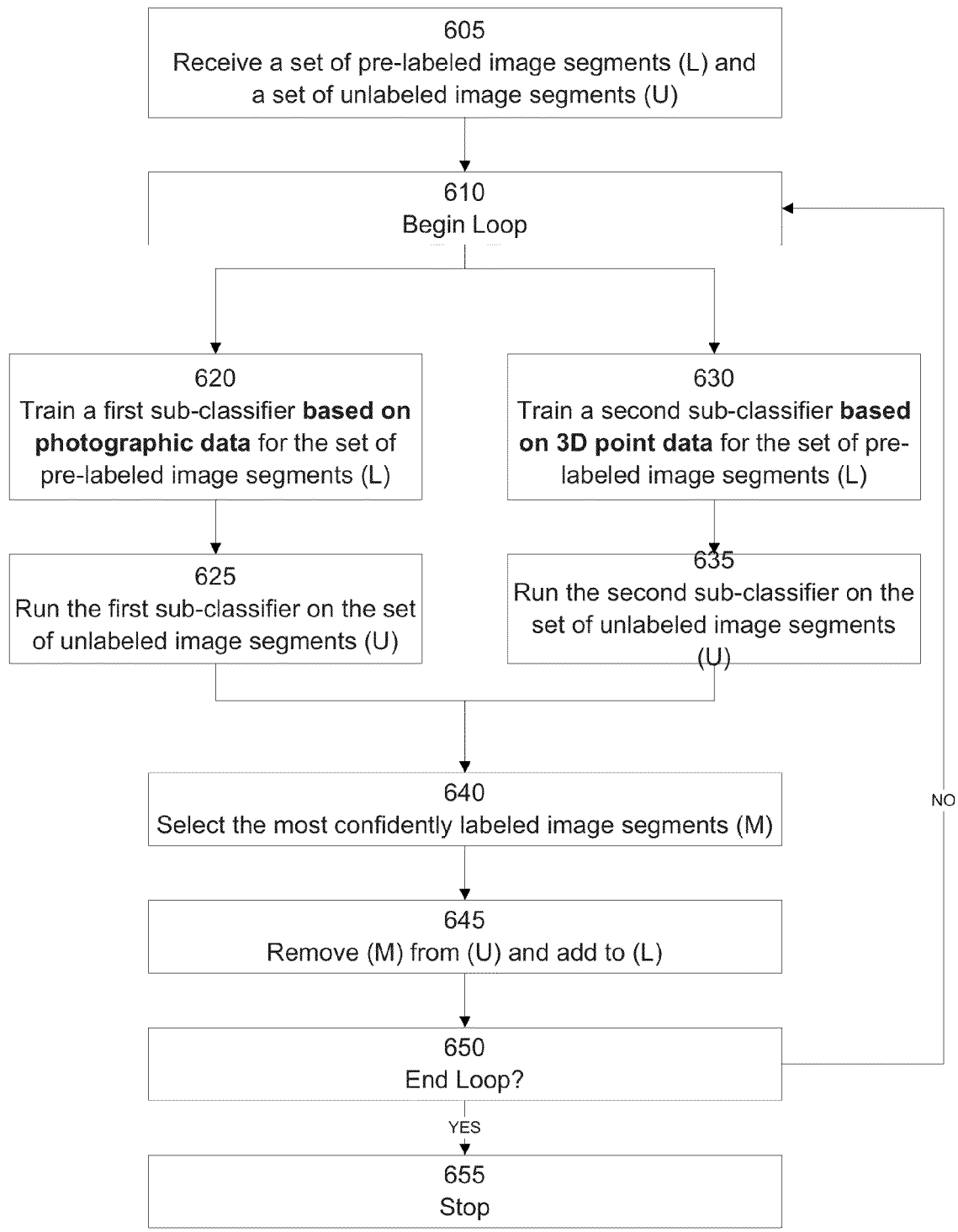
FIG. 6 is a flow chart illustrating a process for generating a classifier configured to label segments of an image, in accordance with one aspect of the subject technology.

FIG. 6 is a flow chart illustrating a process 600 for generating a classifier configured to label segments of an image, in accordance with one aspect of the subject technology. Although the operations in process 600 are shown in a particular order, certain operations may be performed in different orders or at the same time. At operation 605, the interface module 305 may receive a set of pre-labeled image segments and a set of unlabeled image segments that may be used for training the classifier 310. According to one aspect, this initial set of pre-labeled image segments may be manually labeled and accepted by the system as correct.

Each of the image segments in the set of pre-labeled image segments and the set of unlabeled image segments may be associated with at least two different sets of data (e.g., photographic data and 3D point data) corresponding to the image segment. After the image segments are received, the system may begin a number of training iterations at operation 610, where at least two sub-classifiers are trained on different data sets for the image segments.

According to one aspect, at operation 620, a training module 250 may train a first sub-classifier based on photographic data for the set of pre-labeled image segments. The training may involve, for each pre-labeled image segment, identifying the label for the pre-labeled image segment, determining photographic data features for the pre-labeled image segment, and associating the photographic data features with the label.

For example, a particular image segment may have been manually labeled "Sky." The training module 250 may determine the photographic data features or particular characteristics of the labeled image segment (e.g., the color histogram, texture histogram, or gradient histogram may be of a certain range or they my share a particular relationship with one another). These photographic data features may be associated with the label "Sky" and the association may be stored in a database for future reference (e.g., for use in assigning a label to an unlabeled image segment, see operation 625).

At operation 630, the training module 250 may also train the second sub-classifier based on 3D point data for the set of pre-labeled image segments. The training may involve, for each pre-labeled image segment, identifying the label for the pre-labeled image segment, determining 3D point data features for the pre-labeled image segment, and associating the 3D point data features with the label.

According to one aspect, once the sub-classifiers are trained using the set of pre-labeled image segments, each sub-classifier may be run on the set of unlabeled image segments at operations 625 and 635. For the first sub-classifier, this may involve, for each unlabeled image segment, analyzing the unlabeled image segment, determining the photographic data features of the unlabeled image segment, and identifying a label that is associated with a set photographic data features that is most similar to the photographic data features of the unlabeled image segment. The first sub-classifier may then associate the identified label with the unlabeled image segment (e.g., assign the label to the image segment). The association between the identified label and the unlabeled image segment may also have a corresponding confidence value based on how similar the photographic data features of the unlabeled image segment are to the photographic data features associated with the identified label.

Running the second sub-classifier on the set of unlabeled image segments may involve, for each unlabeled image segment, analyzing the unlabeled image segment, determining the 3D point data features of the unlabeled image segment, and identifying a label that is associated with a set 3D point data features that is most similar to the 3D point data features of the unlabeled image segment. The second sub-classifier may then associate the identified label with the unlabeled image segment (e.g., assign the label to the image segment). The association between the identified label and the unlabeled image segment may also have a corresponding confidence value based on how similar the 3D point data features of the unlabeled image segment are to the 3D point data features associated with the identified label.

In one aspect, the associations between the unlabeled image segments and their labels and the confidence values corresponding to the associations may be referred to as a labeling solution. After the labeling solution has been generated, the update module 260 may select one or more of the associations of the labeling solution, accept the associations as correct, and add the image segment and the corresponding label of the association to the set of pre-labeled image segments so that they may be used to train the classifier in further iterations.

For example, at operation 640, the update module 260 may select the most confidently labeled image segments, remove these image segments from the set of unlabeled image segments, and add the image segments along with their corresponding labels to the set of pre-labeled image segments (see operation 645). The selected image segments and their corresponding labels may be the most confidently labeled if, for example, they are associated with confidence values over a threshold value or if they have the highest confidence values out of all of the other image segments of the labeling solution.

Once the set of pre-labeled image segments has been updated by the update module 260, the update module 260 may determine whether or not additional iterations of training are to be performed at operation 650. In one aspect, a set number of iterations may be performed (e.g., 1, 3, 6, etc.). In another aspect, after each training operation, the labeling module 260 may run the classifier on a test set of data and the labeling solution produced may be compared with a verified labeling solution in order to determine the accuracy of the classifier. If the classifier performs at or above a threshold level of accuracy, the system may stop. If the classifier does not perform at or above a threshold level of accuracy, additional iterations may be performed.

If additional training is needed, the first and second sub-classifier may be trained based on the augmented set of pre-labeled image segments that has been updated with the image segments labeled by the first and second sub-classifiers in previous iterations. If no additional training is needed, the classifier may stop the training process at operation 655.

As a result of the process 600, a number of image segments from the set of unlabeled image segments may be confidently labeled by the one or more of the sub-classifiers during the training process 600. Furthermore, at the end of the training process 600, the sub-classifiers may be used by the system to label new unlabeled image segments.

Although various aspects of the subject technology are discussed with respect to using two sub-classifiers, a different number of sub-classifiers may also be used. Furthermore, other types of data sets may also be used by the sub-classifiers.

Additionally, although various aspects of the subject technology are discussed with respect to labeling image segments, the various aspects discussed may also apply to identifying labels for 3D points instead of the image segments.

Figure 7:
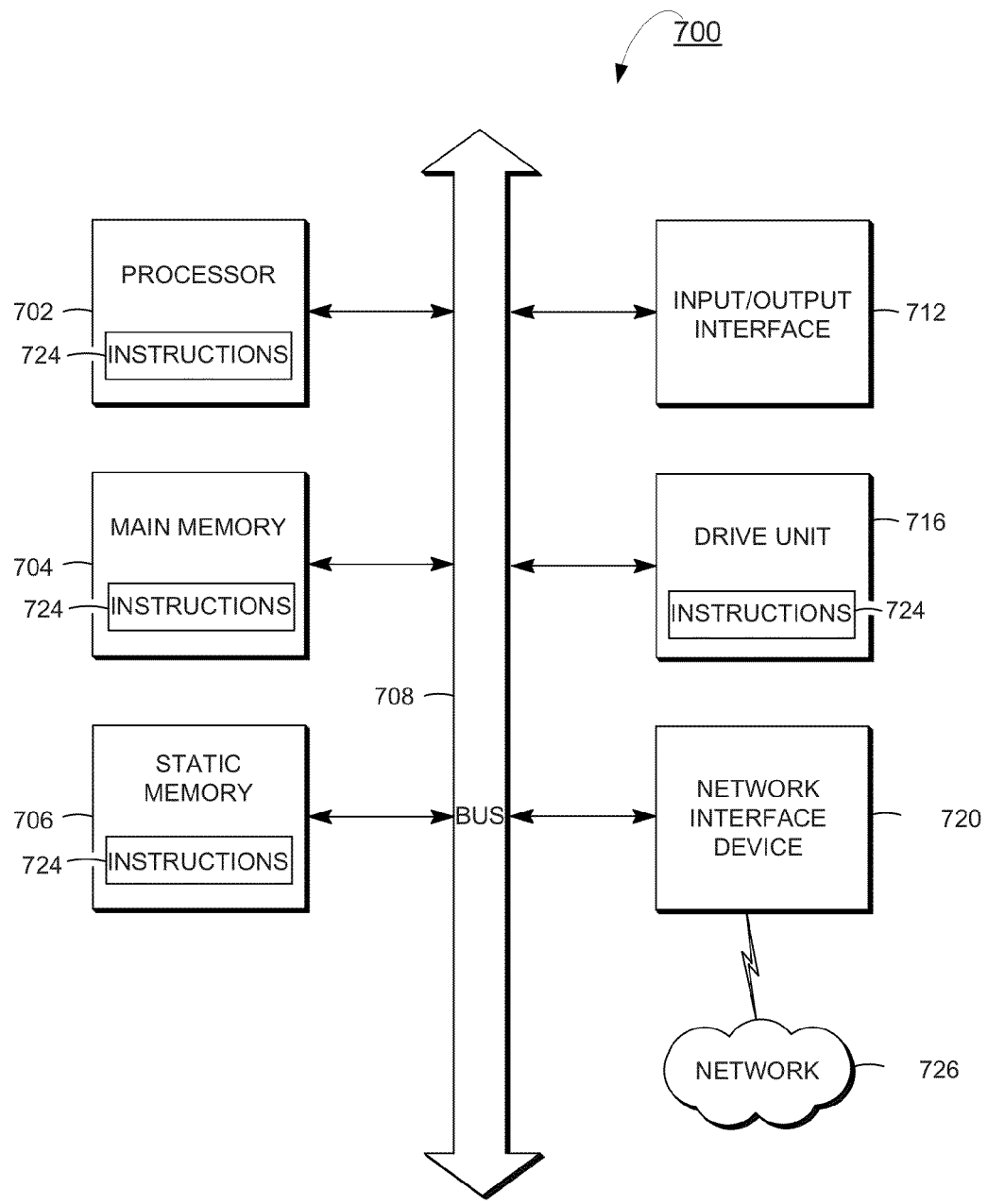
FIG. 7 is a block diagram illustrating a computer system with which any of the clients, servers, or systems discussed may be implemented, according to various aspects of the subject technology.

FIG. 7 is a block diagram illustrating a computer system with which any of the clients, servers, or systems discussed may be implemented, according to various aspects of the subject technology. In certain aspects, the computer system 700 may be implemented using hardware or a combination of software and hardware, either in a dedicated server, or integrated into another entity, or distributed across multiple entities.

The example computer system 700 includes a processor 702, a main memory 704, a static memory 706, a disk drive unit 716, and a network interface device 720 which communicate with each other via a bus 708. The computer system 700 may further include an input/output interface 712 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 702 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 724 embodying any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media. The instructions 724 may further be transmitted or received over a network 726 via the network interface device 720.

The machine-readable medium may be a single medium or multiple media (e.g., a centralized or distributed database, and/or associated caches and servers) that store the one or more sets of instructions. The machine-readable medium may include the drive unit 716, the static memory 706, the main memory 704, the processor 702, an external memory connected to the input/output interface 712, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for generating a classifier configured to label segments of an image, wherein the classifier comprises a first sub-classifier and a second sub-classifier are discussed. According to one aspect, the system may include a training module, a labeling module, and an update module. The training module may be configured to train a first sub-classifier based on photographic data for a set of pre-labeled image segments and a second sub-classifier based on 3-dimensional (3D) point data for the set of pre-labeled image segments. The labeling module may be configured to generate a labeling solution comprising a plurality of associations between an image segment from the set of unlabeled image segments and a label, wherein the labeling solution is generated by running the first sub-classifier on a set of unlabeled image segments and running the second sub-classifier on the set of unlabeled image segments. The update module may be configured to update the set of pre-labeled image segments based on the labeling solution generated by the first sub-classifier and the second sub-classifier. The training module may also be configured to train the first sub-classifier and the second sub-classifier based on the updated set of pre-labeled image segments.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for generating a classifier configured to automatically label segments of an image, wherein the classifier comprises a first sub-classifier and a second sub-classifier, the method comprising:

training a first sub-classifier based on photographic data for a labeled set of image segments and a second sub-classifier based on 3-dimensional (3D) point data for the labeled set of image segments, wherein each of the labeled image segments can be a portion of a larger image partitioned into a plurality of the image segments based on similarity of pixels within the segment and differences with pixels which are outside a boundary of the segment;

automatically creating, based on the training, a labeling solution for an unlabeled, second set of image segments by running the first sub-classifier on the second set of image segments and running the second sub-classifier on the second set of image segments, wherein the labeling solution comprises a plurality of associations, each association of the plurality of associations linking an image segment from the set of unlabeled image segments with a label;

updating the labeled set of image segments based on the labeling solution, including adding an image segment of the second segments to the labeled set of image segments together with a label having at least one of the associations with the added segment; and retraining the first sub-classifier and the second sub-classifier based on the updated labeled set of image segments.

2. The method of claim 1, wherein the creating, the updating, and the retraining is repeated for at least one iteration.

3. The method of claim 1, wherein the running of the first sub-classifier on the second set image segments is based on photographic data for the second set of image segments and wherein the running of the second sub-classifier on the second set of image segments is based on 3D point data for the second set of image segments.

4. The method of claim 1, wherein the training of the first sub-classifier based on photographic data for the labeled set of image segments comprises:

for each image segment in the labeled set of image segments:
identifying a label corresponding to the image segment,
determining photographic data features for the image segment, and
associating the photographic data features with the identified label; and
wherein the training of the second sub-classifier based on 3-dimensional (3D) point data for the labeled set of image segments comprises, for each image segment in the first set of image segments:
identifying the label corresponding to the image segment,
determining 3D point data features for the image segment, and
associating the 3D point data features with the identified label.

5. The method of claim 1, further comprising:

receiving the labeled set of image segments, wherein each image segment in the labeled set of image segments is associated with photographic data and 3-dimensional (3D) point data for the image segment; and receiving the second set of image segments, wherein each image segment in the second set of image segments is associated with photographic data and 3-dimensional (3D) point data for the unlabeled image segment.

6. The method of claim 1, wherein each association of the labeling solution is associated with a confidence value.

7. The method of claim 6, wherein the updating further comprises:
selecting the label from the labeling solution based on the confidence value associated with the selected association; and
removing the image segment from the second set of image segments,
wherein the adding adds the image segment and the label for the selected association to the labeled set of image segments.

8. A system for generating a classifier configured to label segments of an image, wherein the classifier comprises a first sub-classifier and a second sub-classifier, the system comprising:
at least one processor; and
a plurality of modules, each module including at least one of: a hardware component, or a plurality of instructions executable by the at least one processor, the modules including:
a training module configured to train a first sub-classifier based on photographic data for a set of pre-labeled image segments and a second sub-classifier based on 3-dimensional (3D) point data for the set of pre-labeled image segments, wherein each of the pre-labeled image segments can be a portion of a larger image partitioned into a plurality of the pre-labeled image segments based on similarity of pixels within the segment and differences with pixels which are outside a boundary of the segment;
a labeling module configured to generate a labeling solution comprising a plurality of associations between each of a plurality of image segments from a set of unlabeled image segments and a corresponding label of a plurality of labels, wherein the labeling solution is generated by running the first sub-classifier on the set of unlabeled image segments and running the second sub-classifier on the set of unlabeled image segments; and
an update module configured to update the set of pre-labeled image segments based on the labeling solution generated by the first sub-classifier and the second sub-classifier wherein the update includes adding an image segment of the unlabeled image segments to the pre-labeled image segments together with a label having at least one of the associations with the added segment
wherein the training module is further configured to retrain the first sub-classifier and the second sub-classifier based on the updated set of pre-labeled image segments.

9. The system of claim 8, wherein the labeling module, the update module, and the training module are configured to generate the labeling solution, update the set of pre-labeled image segments, and retrain the first sub-classifier and the second sub-classifier based on the updated set of pre-labeled image segments for more than one iteration.

10. The system of claim 8, wherein the training module is configured to train of the first sub-classifier by:
for each pre-labeled image segment in the set of pre-labeled image segments:
identifying a label corresponding to the pre-labeled image segment,
determining photographic data features for the pre-labeled image segment, and
associating the photographic data features with the identified label; and wherein the training module is configured to train of the second sub-classifier by, for each pre-labeled image segment in the set of pre-labeled image segments:
identifying the label corresponding to the pre-labeled image segment,
determining 3D point data features for the pre-labeled image segment, and
associating the 3D point data features with the identified label.

11. The system of claim 8, wherein each association in the labeling solution has a corresponding a confidence value.

12. The system of claim 11, wherein the update module is configured to update the set of pre-labeled image segments by:
selecting an association of an image segment from the set of unlabeled image segments and a label from the labeling solution based on the confidence value associated with the selected association;
removing the image segment from the set of unlabeled image segments; and
wherein the adding adds the image segment and the label for the selected association to the set of pre-labeled image segments.

13. The system of claim 8, wherein the plurality of modules further comprises an interface module configured to:
receive the set of pre-labeled image segments, wherein each pre-labeled image segment is associated with photographic data and 3-dimensional (3D) point data for the pre-labeled image segment; and
receive the set of unlabeled image segments, wherein each unlabeled image segment is associated with photographic data and 3-dimensional (3D) point data for the unlabeled image segment.

14. The system of claim 13, wherein the set of pre-labeled image segments received by the interface module are manually labeled.

15. A non-transitory machine-readable medium comprising instructions stored therein, which when executed by a machine, cause the machine to perform operations comprising:
training a first sub-classifier based on photographic data for a set of pre-labeled image segments and a second sub-classifier based on 3-dimensional (3D) point data for the set of pre-labeled image segments, wherein each of the pre-labeled image segments can be a portion of a larger image partitioned into a plurality of the segments based on similarity of pixels within the segment and differences which are outside a boundary of the segment; and
for at least one iteration:
generating a labeling solution by running the first sub-classifier on a set of unlabeled image segments and running the second sub-classifier on the set of unlabeled image segments,
wherein the running of the first sub-classifier on the set of unlabeled image segments is based on photographic data for the set of unlabeled image segments and wherein the running of the second sub-classifier on the set of unlabeled image segments is based on 3D point data for the set of unlabeled image segments,
and wherein the labeling solution comprises a plurality of associations, each association of the plurality of associations linking an image segment from the set of unlabeled image segments with a label, and wherein each association is associated with a confidence value,
updating the set of pre-labeled image segments based on the labeling solution generated by the first sub-classifier and the second sub-classifier, including adding an image segment of the unlabeled image segments to the pre-labeled image segments together with a label having at least one of the associations with the added segment, and training the first sub-classifier and the second sub-classifier based on the updated set of pre-labeled image segments.

16. The non-transitory machine-readable medium of claim 15, wherein the updating comprises:

selecting an association of an image segment from the set of unlabeled image segments and a label from the labeling solution based on the confidence value associated with the selected association;

removing the image segment from the set of unlabeled image segments; and wherein the adding adds the image segment and the label for the selected association to the set of pre-labeled image segments.

17. The non-transitory machine-readable medium of claim 15, wherein the training of the first sub-classifier based on photographic data for the set of pre-labeled image segments comprises:

for each pre-labeled image segment in the set of pre-labeled image segments:

identifying a label corresponding to the pre-labeled image segment, determining photographic data features for the pre-labeled image segment, and associating the photographic data features with the identified label; and wherein the training of the second sub-classifier based on 3-dimensional (3D) point data for the set of pre-labeled image segments comprises, for each pre-labeled image segment in the set of pre-labeled image segments:

identifying the label corresponding to the pre-labeled image segment, determining 3D point data features for the pre-labeled image segment, and associating the 3D point data features with the identified label.

* * * * *